United States Patent [19]

Stegmeier

[11] Patent Number: 5,695,586

[45] Date of Patent: Dec. 9, 1997

[54] METHOD OF INSTALLING PERIMETER LIGHTING ABOUT A LINER TYPE SWIMMING POOL

[76] Inventor: William J. Stegmeier, 1115 W. Harris Rd., Arlington, Tex. 76017

[21] Appl. No.: 725,611

[22] Filed: Oct. 3, 1996

[51] Int. Cl.$^6$ .......................... B29C 39/00; B32B 31/00; B22D 19/00
[52] U.S. Cl. .......................... 156/245; 156/247; 249/83; 249/DIG. 3; 264/275; 264/278
[58] Field of Search .......................... 156/60, 245, 247; 264/275, 278; 249/83, 96, 117, DIG. 3

[56] References Cited

U.S. PATENT DOCUMENTS

| | | | |
|---|---|---|---|
| 3,872,195 | 3/1975 | Stegmeier | 264/35 |
| 4,457,119 | 7/1984 | Dahowski | 52/300 |
| 4,574,017 | 3/1986 | Stegmeier | 156/60 |
| 4,901,492 | 2/1990 | Coates | 52/300 |
| 4,967,424 | 11/1990 | Stegmeier | 4/496 |
| 4,980,934 | 1/1991 | Dahowski et al. | 4/496 |
| 5,170,517 | 12/1992 | Stegmeier | 4/496 |

*Primary Examiner*—David A. Simmons
*Assistant Examiner*—J. A. Lorengo
*Attorney, Agent, or Firm*—Daniel Rubin

[57] ABSTRACT

A method of securing elongated lengths of lighting track in the aggregate coping face of a liner type swimming pool. The method includes applying double sided adhesive tape to a shelf face of a form board utilized to define the cross-sectional contour of coping to be poured. The track is removably mounted adhesively against the tape and retained thereat until after curing of the aggregate has been completed. Following curing of the aggregate, the form board is removed to expose the face of the track in the face of the coping.

8 Claims, 3 Drawing Sheets

METHOD OF INSTALLING PERIMETER LIGHTING ABOUT A LINER TYPE SWIMMING POOL

FIELD OF THE INVENTION

The field of art to which the invention relates comprises the art of installing elongated lengths of continuous lighting segments about the internal perimeter of a liner type swimming pool.

BACKGROUND OF THE INVENTION

It has long been a custom to provide lighting with swimming pools as an illumination aid for night swimming. Typically, the lighting has been of the incandescent variety secured and sealed behind a water proof lens at various locations below water level in a pool wall of concrete. Forms of deck lighting secured spaced about the decking has likewise been common. Recently, there has been a trend toward employing elongated strips of fiber optic lighting either ancillary to or instead of the other forms of lighting previous utilized.

DESCRIPTION OF THE PRIOR ART

Fiber optic strip lighting has recently become increasingly popular for use in and about swimming pools. Such lighting is available from commercial sources and is generally comprised of elongated lengths of a transparent sleeve or envelope containing a longitudinal bundle of generally parallel fiber optic strands. Whether extending continous or in separated segments about the internal pool perimeter, steprisers, or other concrete or tile face, its function is to introduce a safety factor in the form of enhanced illumination aid for night swimming.

Typically, past installations of such fiber optic strips has included elongated channel sections defining a track in which the transparent sleeve and fiber optic strand elements extend and are exposed inward toward the pool. For mounting the channels in a concrete pool, they are positioned against the tile or concrete surface about the internal pool perimeter at which they can be secured with double faced pressure sensitive tape and silicone caulking. A form of installation in which the track is secured in the concrete for positioning about the tile face of an in-ground concrete pool is disclosed in my prior U.S. Pat. No. 5,170,517 incorporated herein by reference.

In the case of a liner type pool, the choices of a placement site for a lighting track has been more difficult to come by. That is, the liner for such pools are typically comprised of a sheet of bead edge plastic composition. The liner is secured in place by a channel in which the bead is inserted as, for example, disclosed in my prior U.S. Pat. No. 4,967,424 also incorporated herein by reference. The liner is secured via the bead in, near or at the upper wall surface of the pool and usually requires periodic replacement. With the liner being replaceable, it is not feasible to locate any perimeter lighting against the liner or in another location where the lighting would interfere with removal or installation of the liner.

Despite recognition of the foregoing, it has not heretofore been known how to conveniently install perimeter lighting about a liner type pool.

OBJECTS OF THE INVENTION

It is an object of the invention to provide a novel method for installing perimeter lighting about a liner type swimming pool.

It is another object of the invention to provide the method of installation as in the previous object in which the installed lighting is at a site location that does not interfere with replacement requirements of the liner.

It is yet another object of the invention to effect the previous objects in a highly convenient, economical and expeditious manner.

SUMMARY OF THE INVENTION

This invention relates to an improved method for installing strip lighting in and about a liner type swimming pool. More specifically, the invention relates to installation of a lighting track for fiber optic strip lighting by means of a method that is highly convenient, economical and expeditiously effected.

For achieving the foregoing, there is utilized a channel support track conducive for concrete anchoring and of any desirable cross-sectional configuration suitable to receive and retain strips of fiber optic lighting. The track may be of a type disclosed in my '517 patent, mentioned supra, that is positioned by means of a polystyrene form board likewise disclosed in my prior '517 patent. The form board is typically placed against a vertical panel surface against which the liner is to be draped and includes a contoured face to shape the concrete or other aggregate comprising the coping to be poured about the pool.

For effecting installation of a lighting track in accordance herewith, a horizontal shelf is formed in the form board at the coping level on which an extended length of double sided adhesive tape is applied. After peeling off the protective layer of the tape, the tape remains in place adhesively exposed. The open face of the lighting track is then pressed against the tape to be adhesively secured thereto. After securing the form board with track in place against a pool panel, aggregate comprising the coping is poured and cured. The form board is then removed to expose the track anchored within the front face of the coping. Thereafter, the lighting strip per se is slidably inserted in the track and can be slidably removed for repair or replacement when required.

The simplicity of installation for the lighting track in accordance with the above can be appreciated in that only a strip of doublefaced adhesive tape is required to be placed on an otherwise utilized form board for receipt of the lighting track to be installed. Thereafter, the form board positions the track during the pouring and curing of the aggregate such that on removal of the form board, the lighting track is exposed and ready for use.

The above noted features and advantages of the invention as well as other superior aspects hereof will be further appreciated by those skilled in the art upon reading the detailed description which follows in conjunction with the drawings.

DESCRIPTION OF THE PREFERRED EMBODIMENT

Figures 1, 2:
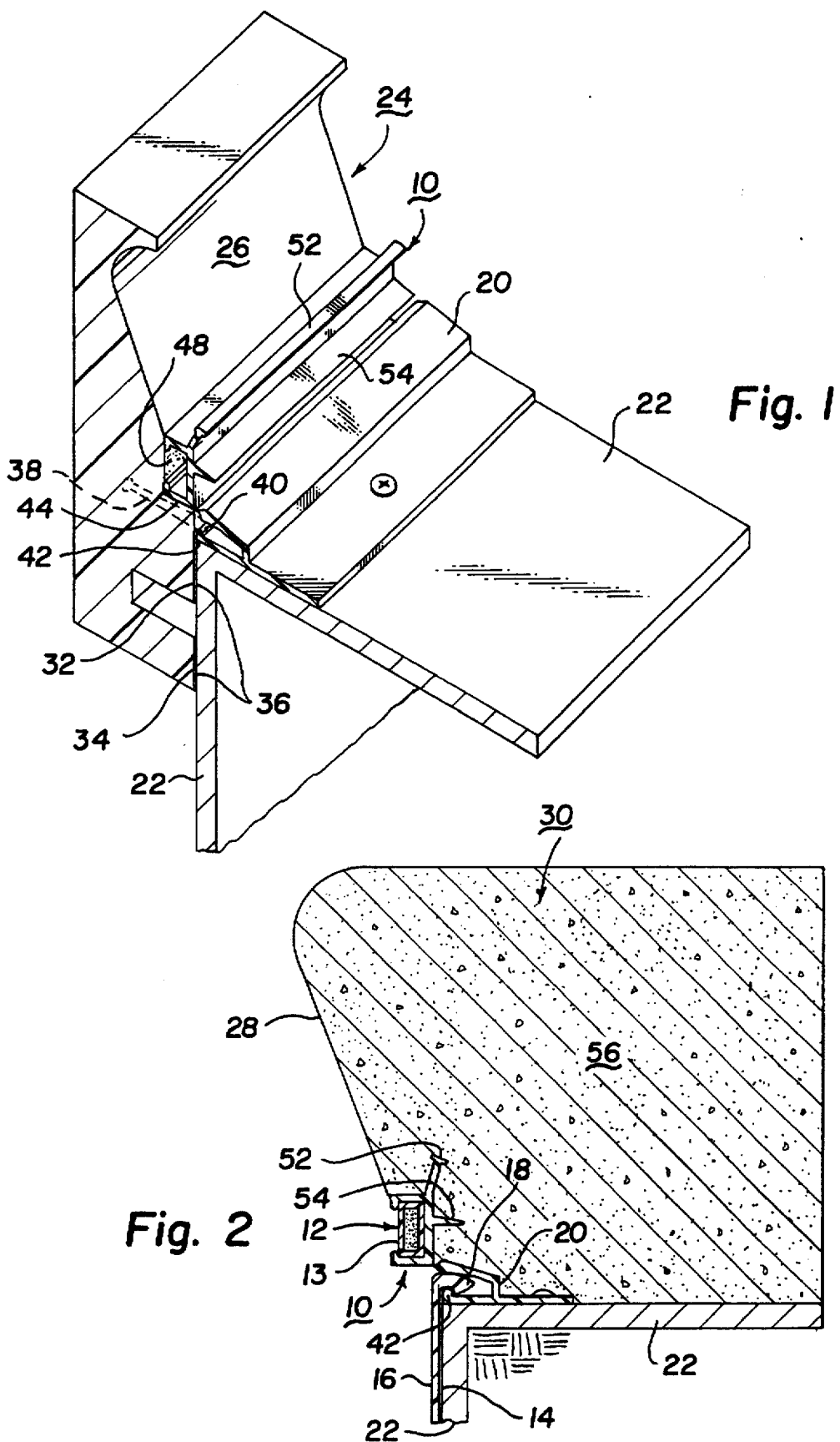
FIG. 1 is a fragmentary isometric elevation view illustrating positioning of the lighting track prior to the coping aggregate being poured thereover.
FIG. 2 is a fragmentary sectional elevation of the completed installation.
Figure 3:
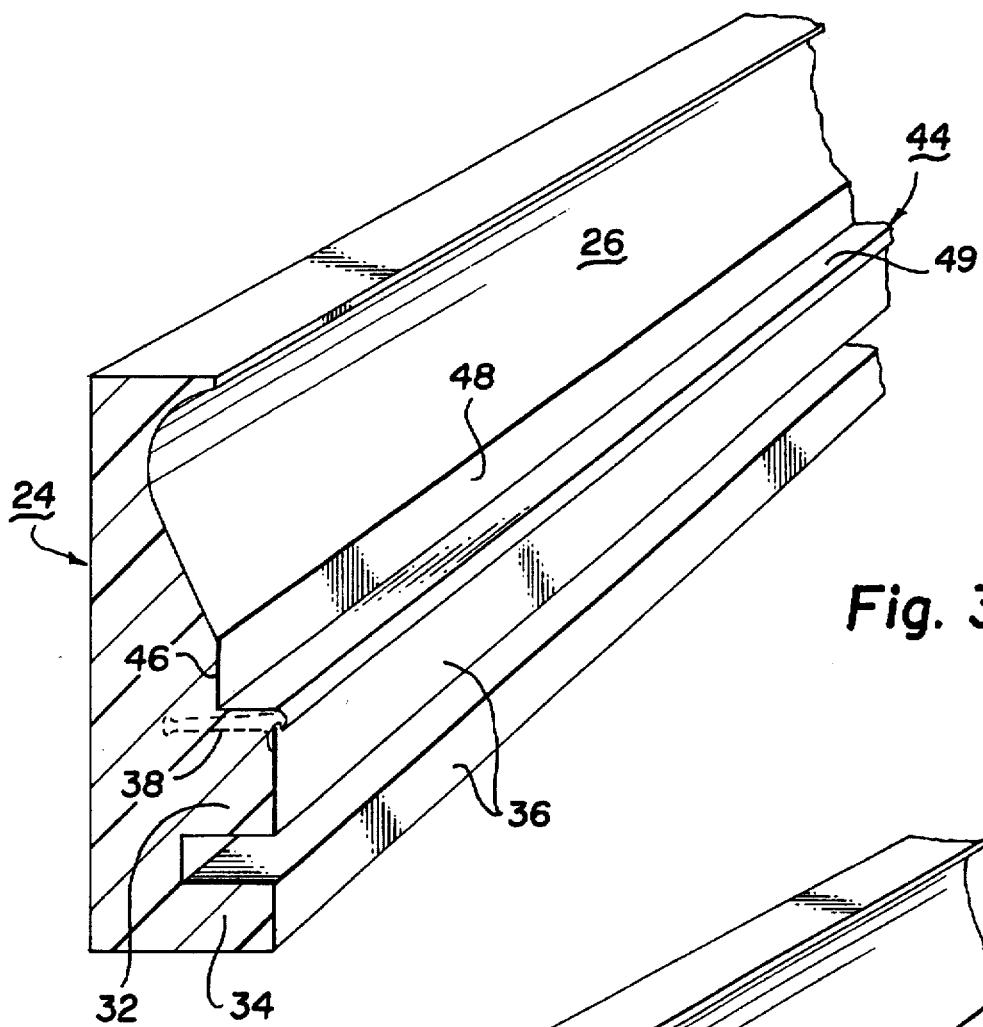
FIG. 3 is a fragmentary isometric view representing a first step in preparing the form board for receipt of the lighting track.

In the description which follows, like parts are marked throughout the specification and drawings with the same reference numerals respectively. The drawing figures are not necessarily to scale and in certain views, proportions may have been exaggerated for purposes of clarity.

Referring now to the drawings, there is illustrated a rectangular shaped light support track 10 that may be of any suitable cross-sectional configuration. The track supports elongated longitudinal lengths of fiber optic strips 12 above the interior perimeter of a pool wall face 14 of panel 22. The fiber optic strips are of a type commercially available and are comprised of a plurality of longitudinal and parallel fiber optic strands 13 extending within a pliable soft and transparent plastic sleeve. Placement of the fiber optic strips within the channel of track 10 can be conducted either before or after the channel track support is secured in place as will be understood. The entire channel track support is preferably formed of a suitable plastic such as molded polyvinyl chloride that includes anchors 52 and 54 and may, for example, be of a type disclosed in my prior '517 patent mentioned supra.

In accordance with the invention, the perimeter lighting hereof is provided in association with a liner type pool that includes a liner 16 having an upper peripheral bead 18 to be secured in a channel 20 horizontally mounted on a prepositioned wall frame 22. Frame 22 can typically comprise sheet metal, fiberglass, molded P.V.C., etc.

Placement setting to mount the track support 10 is effected utilizing a polystyrene form board 24 as mentioned supra contoured at 26 to cross-sectionally shape the face 28 of coping 30 when aggregate 56 is poured and cured. Board 24 includes conventional vertically faced feet 32 and 34 both of which receive an initial application of double sided adhesive tape 36 for supporting the board in place against the vertical face 14 of wall frame 22. Longitudinally spaced laterally extending clips 38 are embedded within the form board at a spacing of about every six inches. The clips distally terminate laterally outward as a hook 40 which when in place effect a secured mounting over ledge 42 of liner channel 20. Also formed in the front face of board 24 for purposes hereof is an offset longitudinal shelf 44 that includes a vertical surface 46 and a horizontal surface 49. A length of doublesided adhesive tape 48 is initially applied to surface 46. With angle shelf 44 having previously been formed in form board 24, applying doublesided tape 48 represents the first step of installing track 10 in accordance with the invention.

Figure 4:
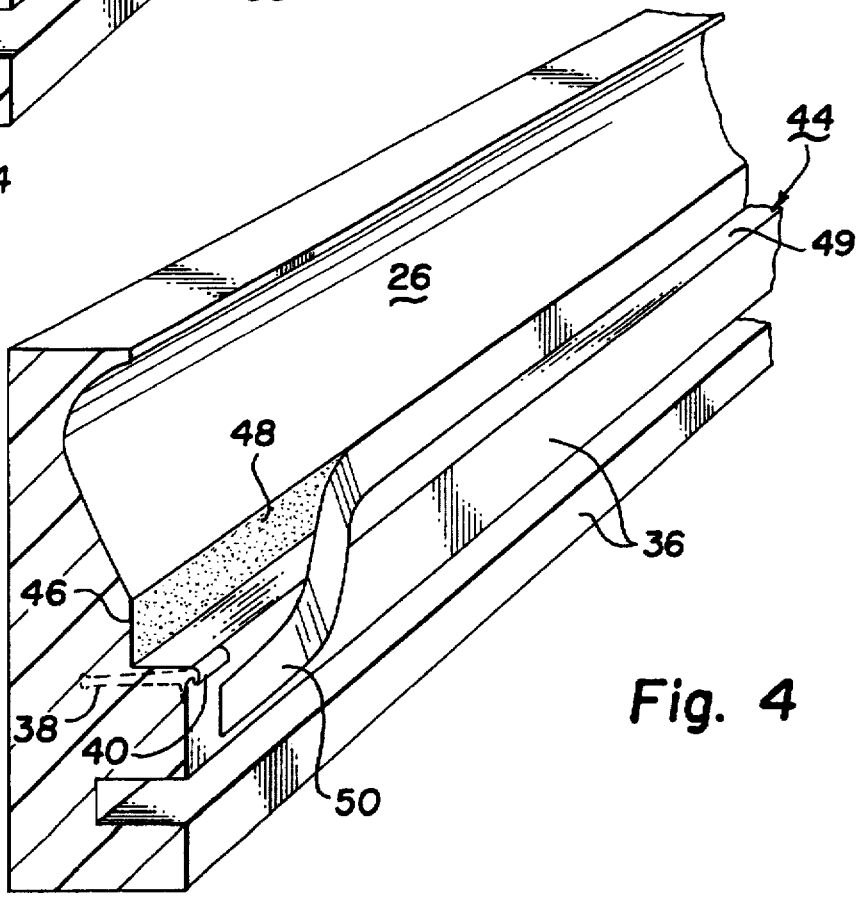
FIG. 4 represents the second and subsequent step in preparating the form board for receipt of the lighting track.
Figure 5:
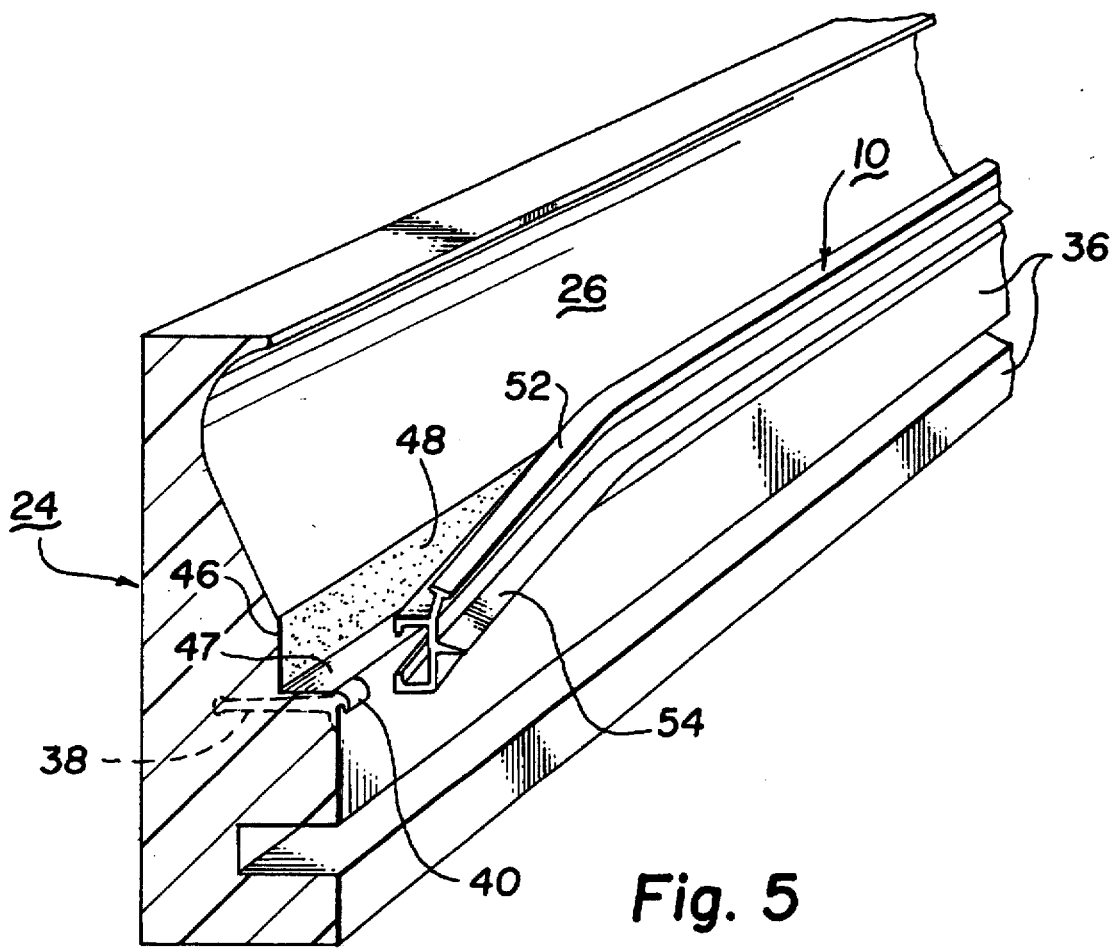
FIG. 5 represents the third and final step in preparing the form board for receipt of the lighting track.

The second step, as best seen in FIG. 4, comprises removing or peeling the non-adhesive protective cover strip 50 from tape 48 so as to expose adhesive surface 48 thereat. Thereafter, track 10 is placed on horizontal surface 49 of shelf 44 and urged rearward until the open channel face of track 10 secures against the adhesive face of tape 48. With the track channel in place, tapes 36 are likewise stripped of their protective cover and the unit is mounted against face 14 of wall frame 22 in the manner illustrated in FIG. 1.

Once the aggregate for coping 30 has been poured and cured, the form board 24 is removed from against panel face 14 leaving track support 10 secured with anchor arms 52 and 54 buried in decking aggregate 56. Thereafter, lighting strip 12 can be easily slipped into track channel 10 and from which it can be readily removed should repair or replacement be required.

By the above description, there is disclosed a novel method of installing a track for supporting elongated lengths of continuous lighting segments about the internal perimeter of a liner type swimming pool. Novelty of the installation resides in the simplicity of steps in association with an otherwise utilized form board to shape the aggregate coping about the pool. The mere use of double sided adhesive tape placed along a vertical shelf of the form board enables the lighting track to be supported during the pouring and curing of the coping aggregate. As a consequence, a permanent track installation in association with a liner type swimming pool can be readily effected with a method of installation that represents a height of simplicity yet leaves the underlying liner track 20 exposed and clear for subsequent installation and/or removal of the liner 16 without interference.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A method of securing elongated lengths of a lighting track in the aggregate coping face of a liner type swimming pool having a pool wall comprising the steps of:

providing a support board;

adhesively mounting an exposed lighting track to said support board;

securing said support board with the track thereon mounted at the coping level displaced from the pool wall in the path of an aggregate coping face to be poured;

pouring the aggregate; and after curing said aggregate, removing said support board to expose a face of said track in the face of said coping.

2. A method in accordance with claim 1 in which said support board comprises a form board for defining the cross-sectional contour of the coping face to be poured and there is included the step of mounting the form board against a vertical panel comprising the pool wall against which a liner is to be draped.

3. A method in accordance with claim 2 in which there is secured a liner channel near an upper face of the pool, said form board includes a plurality of longitudinally spaced laterally extending clips; and said mounting step includes removably securing said clips in said liner channel until at least after said aggregate has cured.

4. A method in accordance with claim 2 in which said form board includes a longitudinal shelf defined in the face thereof, and there is included the steps of applying adhesive to a surface of said shelf and urging said lighting track against the adhesive on said shelf prior to the step of mounting said form board onto said pool panel.

5. A method in accordance with claim 4 in which the step of applying adhesive comprises applying an extended length of double sided adhesive tape to said shelf surface.

6. A method in accordance with claim 5 in which said double sided adhesive tape includes a peelable non-adhesive protective layer overlying an adhesive layer and there is included the step of peeling away said protective layer to expose an underlying adhesive layer prior to engaging said lighting track against the adhesive thereat.

7. A method in accordance with claim 6 in which said shelf is comprised of longitudinally extending diverging surfaces one of which has a vertical orientation and the other of which has a horizontal orientation and the step of applying said tape includes applying the tape onto at least one of said shelf surfaces.

8. A method in accordance with claim 7 in which the step of applying said tape comprises applying said tape to the vertically oriented of said surfaces.

* * * * *